(12) United States Patent
Zou et al.

(10) Patent No.: US 11,621,537 B2
(45) Date of Patent: Apr. 4, 2023

(54) ULTRAFAST LASER

(71) Applicant: WUHAN YANGTZE SOTON LASER CO. LTD., Wuhan (CN)

(72) Inventors: Si Zou, Wuhan (CN); Fei He, Wuhan (CN); Kangkang Chen, Wuhan (CN); Guruo Xu, Wuhan (CN)

(73) Assignee: WUHAN YANGTZE SOTON LASER CO. LTD., Wuhan (CN)

( * ) Notice: Subject to any disclaimer, the term of this patent is extended or adjusted under 35 U.S.C. 154(b) by 204 days.

(21) Appl. No.: 16/984,086

(22) Filed: Aug. 3, 2020

(65) Prior Publication Data

US 2021/0050703 A1 Feb. 18, 2021

(30) Foreign Application Priority Data

Aug. 14, 2019 (CN) .......................... 201910750362.5

(51) Int. Cl.
*H01S 3/13* (2006.01)
*H01S 3/137* (2006.01)

(52) U.S. Cl.
CPC ............ *H01S 3/137* (2013.01); *H01S 3/1308* (2013.01)

(58) Field of Classification Search
CPC .... H01S 3/109; H01S 3/08086; H01S 3/0092; H01S 3/10061; H01S 3/1308; G02F 1/353; G02F 1/354; G02F 1/37; G02B 27/286; G02B 27/283
See application file for complete search history.

(56) References Cited

FOREIGN PATENT DOCUMENTS

| CN | 103368056 | * | 10/2013 | ............. H01S 3/094 |
| CN | 107863680 | * | 3/2018 | ......... H01S 3/10061 |
| CN | 209200368 | * | 8/2019 | |

* cited by examiner

*Primary Examiner* — Xinning(Tom) Niu
*Assistant Examiner* — Delma R Fordé
(74) *Attorney, Agent, or Firm* — Andrew C. Cheng

(57) ABSTRACT

The present disclosure provides an ultrafast laser that outputs multiple wavelengths. The ultrafast laser includes a fundamental frequency ultrafast laser unit, an optical beam splitting and polarization controlling unit, a multiple frequency unit, and an optical beam combining unit. The fundamental frequency ultrafast laser generates a multiple frequency ultrafast laser by the multiple frequency unit, such as double frequency light, triple frequency light, etc., and the optical beam combining unit makes the fundamental frequency light and the double frequency light output in a light outlet, the controlling unit controls the wavelength of the laser of the light outlet by controlling the polarization state of the laser. The ultrafast laser of the present disclosure can realize fast switching output among the fundamental frequency light and multiple frequency light, and output of combined pulse fundamental frequency light and double frequency light. The present disclosure also provides a strong powerful laser tool.

8 Claims, 5 Drawing Sheets

ULTRAFAST LASER

CROSS REFERENCE TO RELATED APPLICATION

This non-provisional patent application claims priority from Chinese patent application No. 201910750362.5 filed on Aug. 14, 2019, the entire content of which is incorporated herein by reference.

TECHNICAL FIELD

The present disclosure relates to the field of lasers, and particularly relates to an ultrafast laser that outputs multiple wavelengths.

BACKGROUND

A laser that outputs multiple wavelengths (infrared light, green light, and ultraviolet light) can be configured to repair the laser OLED screen. Light emitting semiconductors of different colors require lasers of different wavelengths. The laser also can be applied in the semiconductor chip processing. The infrared or ultraviolet light is configured for cutting, and the green light is configured for marking. The laser also can be applied in the solar industry to cut different solar cell membranes.

The conventional multi wavelength laser outputs different light of different waves from different light outlets, and switches between the different light by mechanism. Therefore, the conventional multi wavelength laser is often very complicated.

SUMMARY

In order to solve the above problem, in one aspect, the present invention provides a ultrafast laser, comprising: a fundamental frequency ultrafast laser unit, an optical beam splitting and polarization controlling unit, a multiple frequency unit, and an optical beam combining unit, the fundamental frequency ultrafast laser unit is configured to provide fundamental frequency light of the entire laser optical path and frequency multiplying of the entire laser optical path; the optical beam splitting and polarization controlling unit is configured for optical beam splitting and controlling polarization state of the light; the multiple frequency unit is configured to produce multiple frequency ultrafast laser; the optical beam combining unit is configured to combine the fundamental frequency light and the multiple frequency light to make it output at one light outlet; the fundamental frequency light emitted by the fundamental frequency ultrafast laser unit is divided into S-polarized light and P-polarized light, when it passes through the optical splitting and polarization controlling unit. The P-polarized light enters the optical beam combining unit, and the S-polarized light is combined with the P-polarized light after entering the multiple frequency unit and generating multiple frequency effect.

The The technical solution provided by the present invention has beneficial effects:

(1) By dividing and combining light, the fundamental frequency light and the multiple frequency light is outputted from a same light outlet.

(2) By providing the Pockels cell, wavelength of laser light can be changed.

(3) By controlling the Pockels cell in different voltages, the fundamental frequency light and the multiple frequency light can be combined to be outputted.

It should be understood that the above general description and the following detailed description are only exemplary and do not limit the scope of the present disclosure.

DETAILED DESCRIPTION OF THE EMBODIMENTS

The technical solutions of the present invention will be further specifically described below through the embodiments and the accompanying drawings.

In some embodiments, an ultrafast laser that outputs multiple wavelengths comprises a fundamental frequency ultrafast laser unit, an optical beam splitting and polarization controlling unit, a multiple frequency unit, and an optical beam combining unit, the fundamental frequency ultrafast laser unit is configured to provide fundamental frequency light of the entire laser optical path and frequency multiplying of the entire laser optical path; the optical beam splitting and polarization controlling unit is configured for optical beam splitting and controlling polarization state of the light; the multiple frequency unit is configured to produce multiple frequency ultrafast laser; the optical beam combining unit is configured to combine the fundamental frequency light and the multiple frequency light to make it output at one light outlet; the fundamental frequency light emitted by the fundamental frequency ultrafast laser unit is divided into S-polarized light and P-polarized light, when it passes through the optical splitting and polarization controlling unit. The P-polarized light enters the optical beam combining unit, and the S-polarized light is combined with the P-polarized light after entering the multiple frequency unit and generating multiple frequency effect.

At least one embodiment, the fundamental frequency light and the double frequency light are output at the same light outlet through the beam splitting and combining, which is convenient to use.

Embodiment 1

Figure 1:
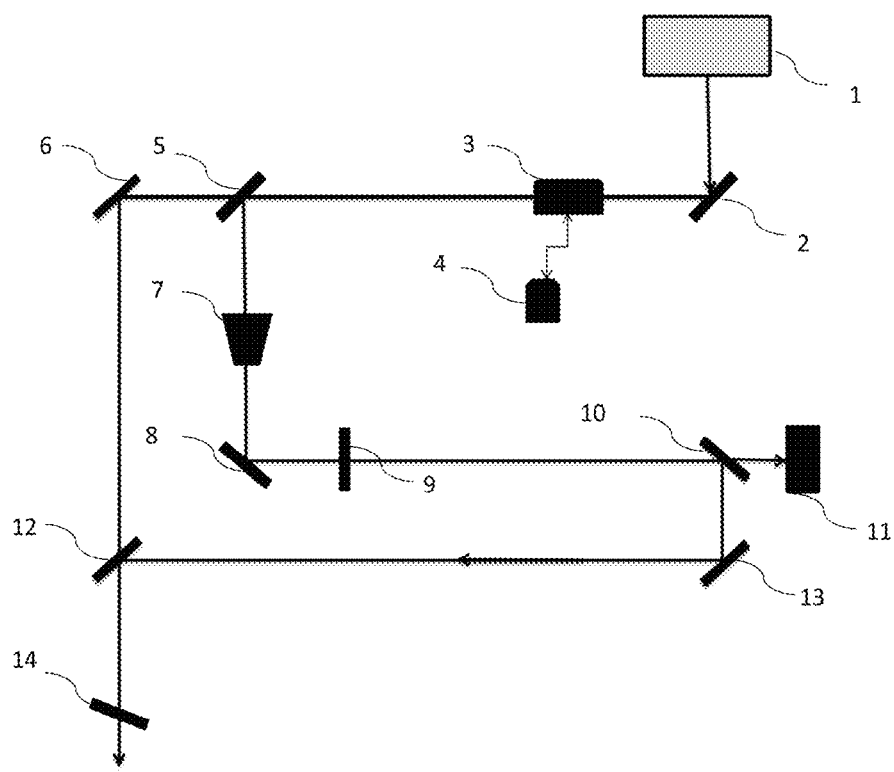
FIG. 1 illustrates a schematic diagram of a composition of a dual-wavelength ultrafast laser that output infrared light (1030 nm) and green light (515 nm) in accordance with one or more embodiments.

Referring to FIG. 1, an ultrafast laser that outputs dual-wavelength comprises a fundamental frequency ultrafast laser unit, an optical beam splitting and polarization controlling unit, a double frequency unit, and an optical beam combining unit.

The fundamental frequency ultrafast laser unit adopts an infrared light ultrafast laser A 1. The infrared light ultrafast laser A 1 is configured to provide fundamental frequency (infrared light) ultrafast laser light to work as frequency-multiplied fundamental frequency light, whose polarization state is vertical (S) Polarization, and pulse width is less than 1 nanosecond.

The beam splitting and polarization controlling unit comprises a first Pockels cell 3, a first Pockels cell driver 4, and a first polarization beam splitter 5. The first Pockels cell 3 acts as a half wave plate when it is in a high voltage state (eg, 4 KV), and has no effect on the laser polarization state when it is in a low voltage state (eg, 0 KV). The rise and fall time of the first Pockels cell driver 4 is less than 10 nanoseconds, and repeated frequency can be 200 KHz, which can realize fast switching of polarization state, thereby achieving rapid switching of different wavelengths of light. The switching time is less than 1 ms. The first polarization beam splitter 5 reflects the S-polarized light of the fundamental frequency light and transmits the P-polarized light of the fundamental frequency light.

The double frequency unit comprises a beam shrinking mirror 7, a reflecting mirror A 8, a double frequency crystal 9, a dichroic mirror A 10 that reflects the frequency doubling light and transmits the fundamental frequency light, a dichroic mirror B 13 that reflects the frequency doubling light and transmits the fundamental frequency light, and an absorbing block A 11. After the S-polarized light is beam-shrunk, it enters the double frequency crystal 9 of Type I LBO reflected by the reflecting mirror A 8 to cause double frequency effect which generates a double frequency light. The polarization state of the double frequency light is horizontal (P) polarization. The dichroic mirror A 10 and the dichroic mirror B 13 are configured to separate the double frequency light, and the light absorbing block A 11 is configured to collect the residual S-polarized light.

The optical beam combining unit comprises a reflecting mirror B 6, a dichroic mirror C 12 that reflects the double frequency light and transmits the fundamental frequency light, a Brewster window A 14 of fundamental frequency light. The P-polarized light transmitted by the first polarization beam splitter 5 and the double frequency light generated by the double frequency crystal 9 of Type I LBO are both P-polarized. The dichroic mirror C 12 is configured to combine the P-polarized light and the double frequency light. The material of Brewster window A 14 is fused silica JGS1. The refractive indexes of fused silica at 1030 nm and 515 nm are respectively 1.4500 and 1.4615. When the laser polarization state of the Brewster window A 14 is P-polarized, the incident angle is an infrared Brewster angle of 55.41°, the transmitting rate of 1030 nm and 515 nm ultrafast laser is 100%. The optical beam combining unit is configured to ensure that the polarization states of the P-polarized light and the double frequency light are same and the P-polarized light and the double frequency light are output at a same light outlet.

Figure 2:
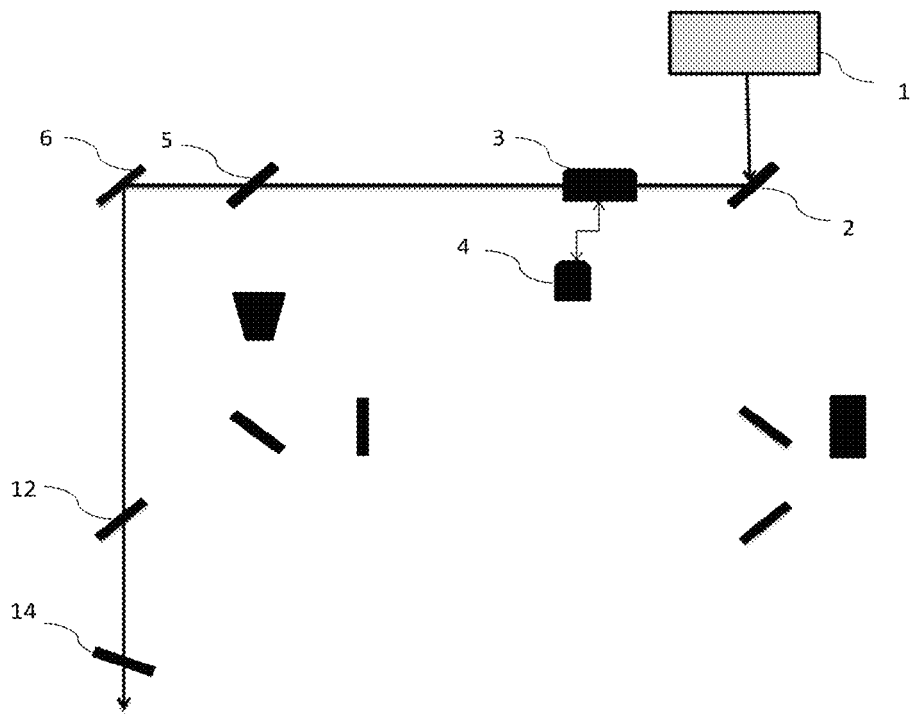
FIG. 2 is a schematic diagram of the dual-wavelength ultrafast laser outputting the infrared ultrafast laser of FIG. 1 in accordance with one or more embodiments.

The process of wavelength switching of the dual-wavelength ultrafast laser and outputting combined pulse of the infrared light (P-polarized light) and the green light (double frequency light) of Embodiment 1 is as follows:

Referring to FIG. 2, the infrared ultrafast laser A 1 with a wavelength of 1030 nm outputs S-polarized laser light, the S-polarized laser light enters the first Pockels cell 3 through the reflecting mirror E 2. The first Pockels cell 3 is in a high voltage state, and the polarization state of the laser light changes to be P-polarized. The P-polarized laser light is transmitted through the first polarization beam splitter 5, then output through the reflecting mirror B 6, the dichroic mirror C 12, and the Brewster window A14. The output ultrafast laser polarization state is P-polarized and the wavelength is 1030 nm.

Figure 3:
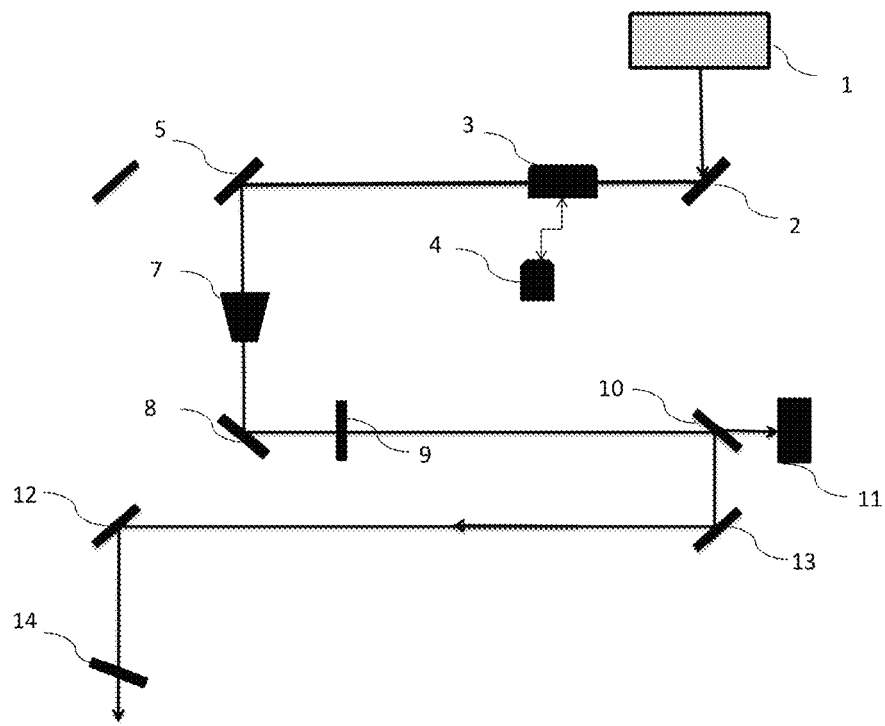
FIG. 3 is a schematic diagram of the dual-wavelength ultrafast laser outputting the green ultrafast laser of FIG. 1 in accordance with one or more embodiments.

Referring to FIG. 3, the infrared ultrafast laser A 1 with a wavelength of 1030 nm outputs S-polarized laser light, the S-polarized laser light enters the first Pockels cell 3 through the reflecting mirror E 2. The first Pockels cell 3 is in a low voltage state, and the polarization state of the laser light remains S-polarized. After being reflected by the first polarizing polarization beam splitter 5, the S-polarized laser light enters the double frequency crystal 9 of type I LBO through the beam shrinking mirror A 7 and the reflecting mirror A 8. The double frequency effect occurs to generate green ultrafast laser. The polarization state of the green ultrafast light is P-polarized. The green ultrafast light is reflected by the dichroic mirror A 10, the dichroic mirror B 13, and the dichroic mirror C 12, and transmitted through the Brewster window A 14. The output ultrafast laser light is P-polarized and the has a wavelength of 515 nm.

Figure 4:
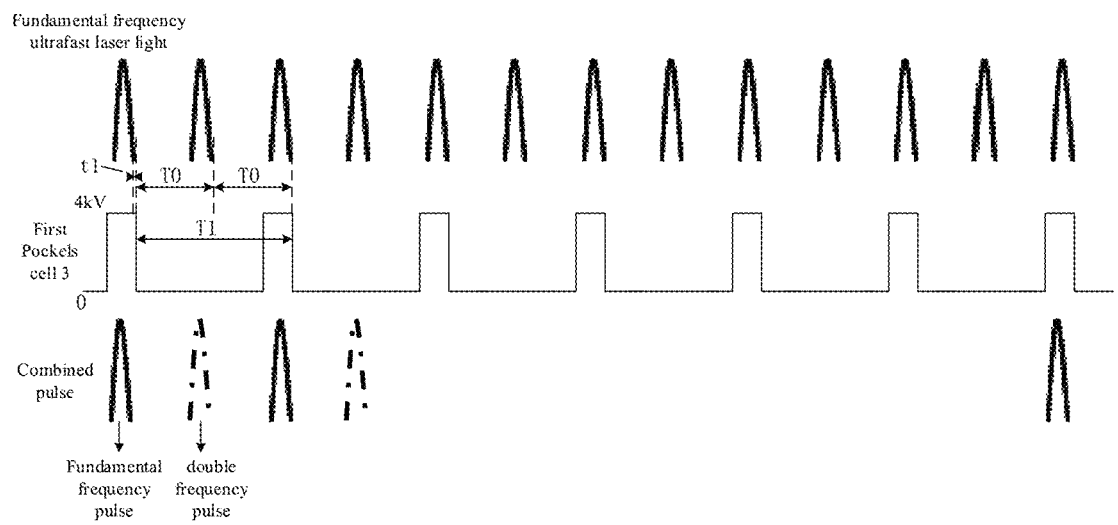
FIG. 4 a timing diagram of the dual-wavelength ultrafast laser outputting combined pulses of the infrared ultrafast laser and the green ultrafast laser of FIG. 1 in accordance with one or more embodiments.

Referring to FIG. 4, a laser pulse period of the infrared ultrafast laser A 1 is T0, a driving voltage period of the first Pockels cell 3 is T1. The time interval between a pulse falling edge of the infrared ultrafast laser A 1 and a pulse falling edge of the first Pockels cell 3 is t1. T1=2×T0, t1=0. Therefore, combined pulse of infrared light and green light can be output as shown in FIG. 4. The pulse period is T0. The driving voltage frequency of the Pockels cell is generally less than 200 KHz, and the period is greater than 5 us. The repeated frequency of the laser needs to be less than 400 KHz and the pulse period is greater than 2.5 us. The optical path difference between the infrared laser light and the green laser light is generally less than 1 m. The interval time of the infrared laser light and the green laser light is less than 3.33 ns, far less than 2.5 us, so the interval of 3.33 ns can be ignored. If there is a device with high repeated frequency, a shorter pulse train can be realized. In addition, different pulse train output can also be achieved by changing the driving voltage modulation method of the first Pockels cell 3.

The double frequency unit of the dual-wavelength ultrafast laser can be placed in the transmitting optical path of the first polarization beam splitter 5, it can also achieve output of infrared light or green light, or combined pulse output of the infrared light and the green light output.

Embodiment 2

Figure 5:
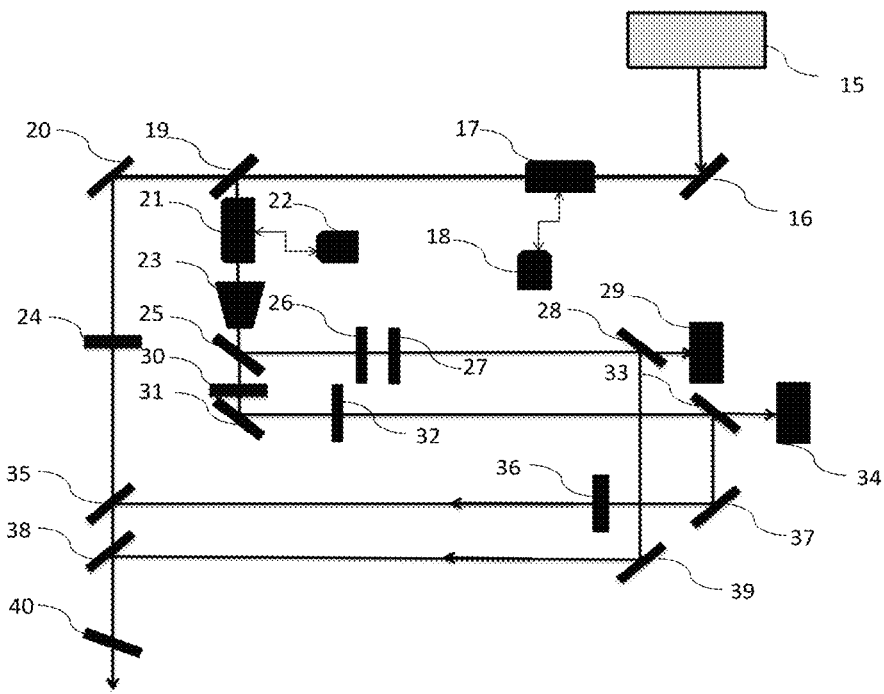
FIG. 5 is a schematic diagram of the composition of a three-wavelength ultrafast laser outputting infrared light (1030 nm), green light (515 nm), and ultraviolet light (343 nm) in accordance with one or more embodiments.

Referring to FIG. 5, an ultrafast laser that outputs three wavelengths comprises a fundamental frequency ultrafast laser unit, an optical beam splitting and polarization controlling unit, a double frequency unit, a triple frequency unit, and an optical beam combining unit.

The fundamental frequency ultrafast laser unit adopts an infrared light ultrafast laser B 15. The infrared light ultrafast laser B 15 is configured to provide fundamental frequency ultrafast laser light to work as frequency-multiplied fundamental frequency light, whose polarization state is S-polarized, and pulse width is less than 1 ns.

The optical beam splitting and polarization controlling unit comprises a second Pockels cell 17, a second Pockels cell driver 18, a second polarization beam splitter 19, a third Pockels cell 21, a third Pockels cell driver 22, and a third polarization beam splitter 25. The second Pockels cell 17 and the third Pockels cell 21 act as half wave plates when it is in a high voltage state, and has no effect on the laser polarization state when it is in a low voltage state. The switching time of Pockels cell is very short, which can realize fast switching of polarization state, thereby achieving fast switching of light of different wavelengths. The second polarization beam splitter 19 divides the fundamental frequency light emitted by the fundamental frequency ultrafast laser unit into S-polarized light and a first P-polarized light; the third polarization beam splitter 25 divides the first S-polarized light into the second S-polarized light and the second P-polarized light.

The double frequency unit comprises a fundamental frequency half wave plate A 30, a reflecting mirror C 31, a first double frequency crystal 32, a dichroic mirror D 33 that reflects the double frequency light and transmits the fundamental frequency light, a dichroic mirror E 37 that reflects the double frequency light and transmits the fundamental frequency light, and light absorbing block B 34. After the second P-polarized light is beam-shrunk, it passes through the fundamental frequency half wave plate A 30, and its polarization state becomes S-polarized, and then enters the type I LBO first double frequency crystal 32 through the reflecting mirror C 31 to cause double frequency effect to generate a double frequency light. The polarization state of the double frequency light is P-polarized. The dichroic mirror D 33 and the dichroic mirror E 37 are configured to separate the double frequency light, and the light absorbing block B 34 is configured to collect the residual S-polarized light.

The triple frequency unit comprises a second double frequency crystal 26, a triple frequency crystal 27, a dichroic mirror A 28 that reflects the triple frequency light and transmits fundamental frequency light and the double frequency light, the dichroic mirror B 39 that reflects the triple frequency light and transmits fundamental frequency light and the double frequency light, and a light absorbing block C 29. After the second S-polarized light is beam shrunk, it enters the Type I LBO second double frequency crystal 26 to generate a P-polarized double frequency light. The remaining S-polarized light and the P-polarized double frequency light enter the type II LBO triple frequency crystal 27 generates S-polarized triple frequency light by the triple frequency effect. The dichroic mirror A 28 and the dichroic mirror B 39 are configured to extract the triple frequency light, and the absorbing block C 29 is configured to collect residual double frequency light and S-polarized light.

The optical beam combining unit comprises a reflecting mirror D 20, a fundamental frequency light half wave plate B 24, a double frequency light half wave plate 36, a dichroic mirror F 35 that reflects double frequency light and transmits fundamental frequency light, and a dichroic mirror C 38 that reflects triple frequency light and transmits fundamental frequency and frequency doubling light, a Brewster window B 40 of fundamental frequency light. The fundamental frequency half wave plate B 24 and the double frequency half wave plate 36 are configured to change the polarization states of the first P-polarized light and the double frequency light to the S-polarized state, so that the polarization states of the first P-polarized light, the double frequency light, and the triple frequency light are all S polarized. The dichroic mirror F 35 is configured to combine the first P-polarized light and the double frequency light, and the dichroic mirror C 38 is configured to combine the transmitted first P-polarized light, double frequency light, and reflected triple frequency light. The material of the Brewster window B 40 is fused silica JGS1. The refractive indexes of the fused silica at 1030 nm, 515 nm, and 343 nm are 1.4500, 1.4615, and 1.4780. When the laser light polarization state of the Brewster window B 40 is P polarized, the incident angle is an infrared light Brewster angle 55.41°, transmittance of 1030 nm, 515 nm, 343 nm ultrafast lasers are respectively 100%, 100% and 99.99%. The optical beam combining unit is configured to ensure that the first P-polarized light, the double frequency light, and the triple frequency light have the same polarization state and are output at a same light outlet.

Figure 6:
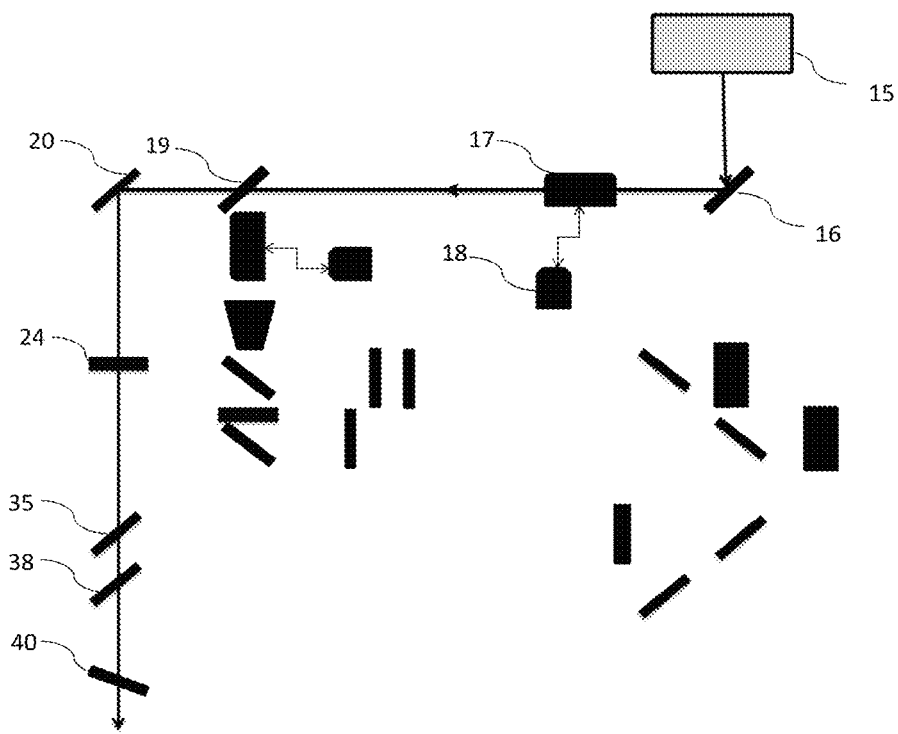
FIG. 6 is a schematic diagram of the three-wavelength ultrafast laser outputting the infrared ultrafast laser of FIG. 5 in accordance with one or more embodiments.

The process of wavelength switching and combined pulse output of the infrared light (first P-polarized light), the green light (double frequency light), and the ultraviolet light (triple frequency light) of the ultrafast laser of Embodiment 2 is as follows:

Referring to FIG. 6, the infrared ultrafast laser B 15 with a wavelength of 1030 nm outputs S-polarized laser light, the S-polarized laser light enters the second Pockels cell 17 through the reflecting mirror F 16. The second Pockels cell 17 is in a high voltage state, and the polarization state of the laser light becomes P-polarized (First P-polarized light). The First P-polarized light is transmitted through the second polarization beam splitter 19, and then enters the fundamental frequency half wave plate B 24 through the reflecting mirror D 20, the polarization state of the P-polarized light becomes S-polarized, and is outputted through the dichroic mirror F 35, the dichroic mirror C 38, and the Brewster window B 40. The output ultrafast laser light (the S-polarized laser light) is S-polarized and the wavelength is 1030 nm.

Figure 7:
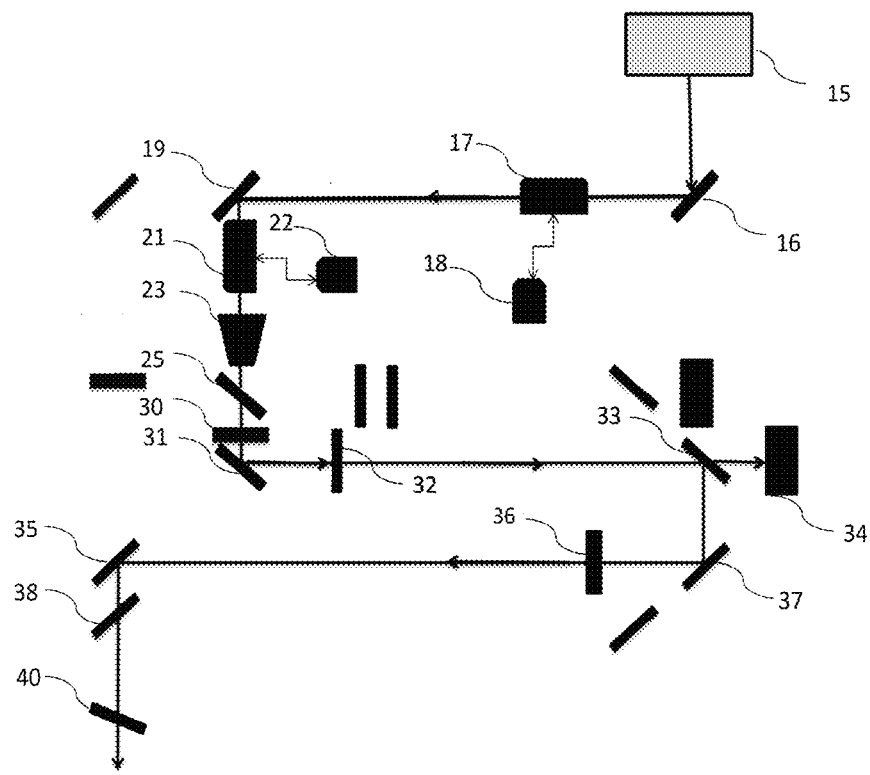
FIG. 7 is a schematic diagram of the three-wavelength ultrafast laser outputting the green ultrafast laser of FIG. 5 in accordance with one or more embodiments.

Referring to FIG. 7, the infrared ultrafast laser B 15 with a wavelength of 1030 nm outputs S-polarized laser light, the S-polarized laser light enters the second Pockels cell 17 through the reflecting mirror F 16. The second Pockels cell 3 is in a low voltage state, and the polarization state of the laser light remains S-polarized. After being reflected by the second polarization beam splitter 19, the laser light enters the third Pockels cell 21. The third Pockels cell 21 is in a high voltage state, and polarization state of the laser light becomes P-polarized (second P-polarized light). The second P-polarized light enters the third polarization beam splitter 25 through the beam shrinking mirror B 23, output by transmitting of the third polarization beam splitter 25, the polarization state is P-polarized, and the polarization state is S-polarized through the fundamental frequency half wave plate A 30. Then, through the reflecting mirror C 31, thesecond P-polarized light enters the type I LBO first double frequency crystal 32, and the double frequency effect occurs to generate a green light ultrafast laser. The polarization state of the green light is P-polarized. The green light is reflected by the dichroic mirror D 33 and the dichroic mirror E 37, and then passes through the double frequency half wave plate 36 to becomes S-polarized. The S-polarized laser light is reflected by the dichroic mirror F 35, and then is transmitted by the dichroic mirror C 38 and the Brewster window B 40 to be outputted. The outputted laser light is S-polarized and the wavelength is 515 nm.

Figure 8:
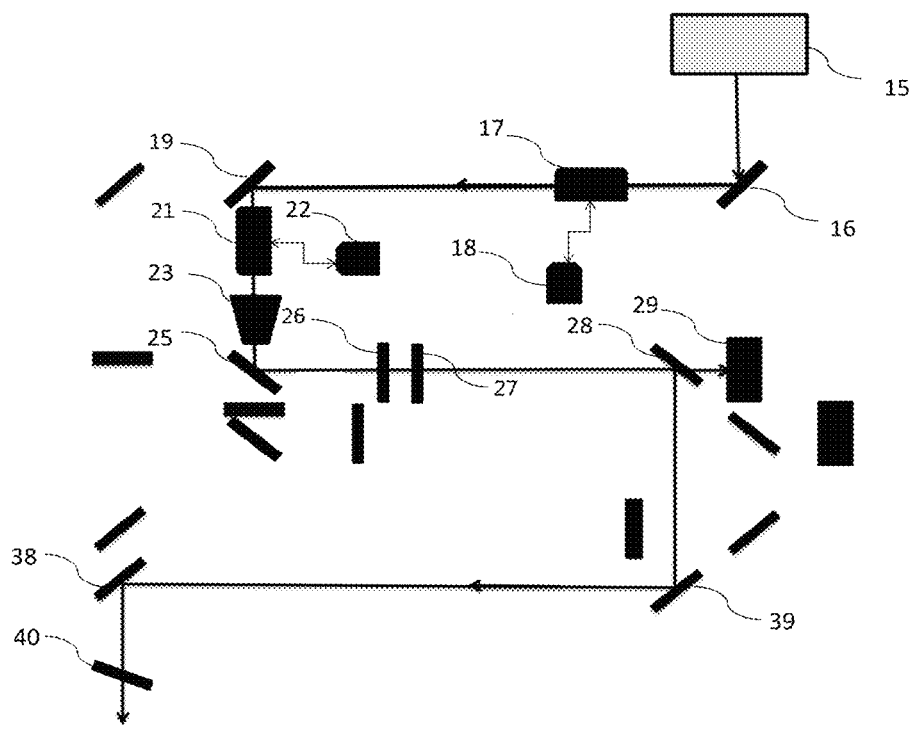
FIG. 8 is a schematic diagram of the three-wavelength ultrafast laser outputting the ultraviolet ultrafast laser of FIG. 5 in accordance with one or more embodiments.

Referring to FIG. 8, the infrared ultrafast laser B 15 with a wavelength of 1030 nm outputs S-polarized ultrafast laser light. The S-polarized ultrafast laser light enters the second Pockels cell 17 through the reflecting mirror F 16. The second Pockels cell 17 is in a low voltage state, and the polarization state of the laser light remains S-polarized. The laser light is reflected by the second polarization beam splitter 19 and enters into the third Pockels cell 21. The third Pockels cell 21 is in a low voltage, the polarization state of the laser light is S-polarized. The laser light enters the third polarization beam splitter 25 through the beam shrinking mirror B 23. The laser light enters the type I LBO second double frequency crystal 26 and type II LBO triple frequency crystal 27 to produce a triple frequency effect to generate ultrafast ultraviolet laser light. The polarization state of the ultraviolet laser light is S-polarized, and is transmitted through the dichroic mirror A28, the dichroic mirror B39, and the dichroic mirror C38, after that, it is transmitted through the Brewster window B40. The outputted ultraviolet laser light is S-polarized and the wavelength is 343 nm.

Figure 9:
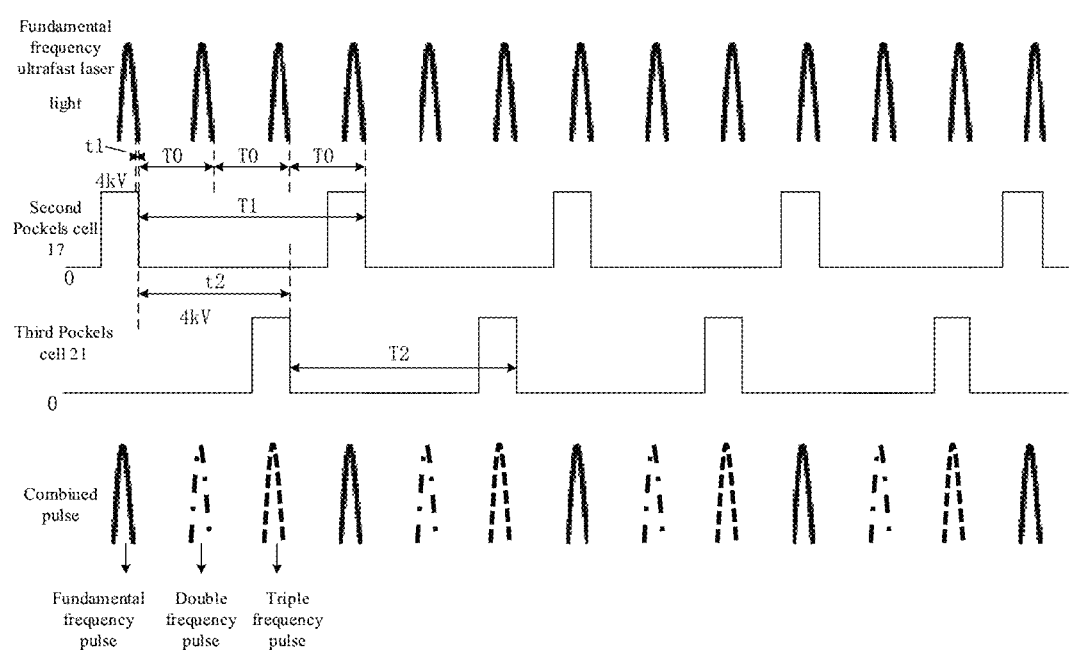
FIG. 9 is a timing diagram of the three-wavelength ultrafast laser outputting combined pulses of the infrared ultrafast laser, the green ultrafast laser, and the ultraviolet ultrafast laser of FIG. 5 in accordance with one or more embodiments.

Referring to FIG. 9, a laser pulse period of the infrared ultrafast laser B15 is T0, a driving voltage period of the second Pockels cell 17 and the third Pockels cell 21 are respectively T1 and T2. The time interval between a pulse falling edge of the infrared ultrafast laser and a pulse falling edge of the second Pockels cell 17 is t1. The time interval between a pulse falling edge of the second Pockels cell 17 and a pulse falling edge of the third Pockels cell 21 is t2. T1=T2=3×T0, t1=0, t2=2×T0, then the combined pulse of infrared light, green light, and ultraviolet light can be output as shown in FIG. 9. The pulse period is 3×T0. The driving voltage frequency of the Pockels cell is generally less than 200 KHz, the period is greater than 5 us. The repeated frequency of the laser needs to be less than 600 KHz, the pulse period is greater than 1.67 us. The optical path difference between infrared laser, the green lasers and the ultraviolet laser is generally less than 1 m, the interval time of the three wavelengths is less than 3.33 ns, far less than 1.67 us, so the time interval of 3.33 ns can be ignored. If there is a device with high repeated rate, a shorter burst can be realized. In addition, different pulse train output can also be achieved by changing the driving voltage modulation method of the second Pockels cell 17 and the third Pockels cell 21.

For the three-wavelength ultrafast laser shown in FIG. 5, the optical paths of 1030 nm, 515 nm, and 343 nm can be interchanged. The frequency doubled or tripled frequency unit can be placed in the transmission optical path of the second polarization beam splitter 19. Furthermore, the third Pockels cell 21 and the third polarization beam splitter 25 can be placed in the transmission optical path of the second polarizing beam splitter 19. The double frequency or triple frequency unit can be placed in the reflection of the second polarizing beam splitter 19. The optical path or the transmission or reflection optical path of the third polarization beam splitter 25. A slight change to the light combining unit can also achieve output or combined pulse output of the infrared light, the green light or the ultraviolet light.

Combined with the dual-wavelength and three-wavelength ultrafast lasers described above, increase the multiple frequency unit (such as: double frequency unit, triple frequency unit, quadruple frequency unit, five frequency unit . . . ), increase the optical beam splitting and polarization controlling unit, adding optical beam combining unit, can realize ultrafast laser with four-wavelength and five-wavelength output. In addition, the output laser wavelength may not comprise the fundamental frequency light. Placing the multiple frequency unit on a suitable optical path can realize a multi-wavelength ultrafast laser only containing multiple frequency light.

The specific embodiments described in the present invention merely exemplify the spirit of the present invention. A person skilled in the art to which the present invention belongs can make various modifications or supplement to the described specific embodiments or substitute in a similar manner without departing from the spirit or scope of the present invention. The embodiments illustrated herein should not be interpreted as limits to the present invention, and the scope of the invention is to be determined by reference to the claims that follow.

The invention claimed is:

1. An ultrafast laser that outputs multiple wavelengths, comprising:
    a fundamental frequency ultrafast laser unit configured to provide output of fundamental frequency light;
    an optical beam splitting and polarization controlling unit configured for optical beam splitting and controlling polarization state of light;
    a multiple frequency unit configured to generate multiple frequency ultrafast laser; and
    an optical beam combining unit configured to combine the fundamental frequency light and the multiple frequency light to make it output at one light outlet;
    wherein the optical beam splitting and polarization controlling unit is located between the multiple frequency unit and the fundamental frequency ultrafast laser unit;
    wherein the fundamental frequency light emitted by the fundamental frequency ultrafast laser unit is divided into S-polarized light and P-polarized light after passing through the optical beam splitting and polarization controlling unit;
    wherein the P-polarized light enters the optical beam combining unit, the S-polarized light generate a multiple frequency effect after entering the multiple frequency unit, and enters the light combining unit to combine with the P-polarized light,
    wherein the optical beam splitting and polarization controlling unit comprises a Pockels cell and a Pockels cell driver configured to control timing sequence of a driving voltage of the Pockets cell to be synchronous with timing sequence of the fundamental frequency light such that the fundamental frequency light and the multiple frequency light can be combined to be outputted as a pulse burst at the light outlet.

2. The ultrafast laser according to claim 1, wherein the multiple frequency unit comprises a double frequency unit, the double frequency unit is configured to generate a double frequency ultrafast laser, the double frequency unit comprises, a reflecting mirror A, a double frequency crystal, and a dichroic mirror A that configured to reflects double frequency light and transmits fundamental frequency light, a dichroic mirror B that configured to reflects double frequency light and transmits the fundamental frequency light, and a light absorbing block A; the optical beam splitting and polarization controlling unit comprises a first polarization beam splitter; the first polarization beam splitter divides the fundamental frequency light emitted by the fundamental frequency ultrafast laser unit into S-polarized light and P-polarized light; the double frequency crystal is configured to generate a P-polarized double frequency light with double frequency effect on the beam-shrunk S-polarized light; the dichroic mirror B and the dichroic mirror A are configured to separate the double frequency light; and the light absorbing block A is configured to collect the residual S polarized light.

3. The ultrafast, laser according to claim 2, wherein the optical beam splitting and polarization controlling unit further comprises a first Pockels cell and a first Pockets cell driver; the double frequency unit is placed in the reflected optical path of the first polarization beam splitter; the first Pockels cell and the first Pockels cell driver are configured to control whether the fundamental frequency light is reflected by or transmitted through the first polarizing beam splitter and also configured to achieve rapid switching of polarization state of the fundamental frequency light.

4. The ultrafast laser according to claim 2, wherein the optical beam combining unit comprises a reflecting mirror B, a dichroic mirror C that reflects the double frequency light and transmits the fundamental frequency light, and a Brewster window A of the fundamental frequency light, the reflecting mirror B is configured to reflect P-polarized light into the dichroic mirror the dichroic mirror C is configured to combine the fundamental frequency light and the double frequency light; the Brewster window A is configured to transmit fundamental frequency light and double frequency light of the same polarization state.

5. The ultrafast laser according to claim 1, wherein the multiple frequency unit comprises a double frequency unit and a triple frequency unit, the double frequency unit is configured to generate a double frequency ultrafast laser, the triple frequency unit is configured to generate a triple frequency ultrafast laser, the double frequency unit comprises a fundamental frequency half wave plate A, a reflecting mirror C, a first double frequency crystal, a dichroic mirror D that reflects the double frequency light and transmits the fundamental frequency light, a dichroic mirror E that reflects the double frequency light and transmits the fundamental frequency light, and a light absorbing block B; the triple frequency unit comprises a second double frequency crystal, a triple frequency crystal, a dichroic mirror A that reflects triple frequency light and transmits the fundamental frequency light and the double frequency light, a dichroic mirror B that reflects triple frequency light and transmits the fundamental frequency light and the double frequency light, and a light absorbing block C; the light beam splitting and polarization controlling unit comprises a polarization beam splitter and another polarization beam splitter; the polarization beam splitter divides the fundamental frequency light emitted by the fundamental frequency ultrafast laser unit into a first S-polarized light and a first P-polarized light; the another polarization beam splitter divides the first S-polarized light into a second S-polarized light and a second P-polarized light; the fundamental frequency half wave plate A is configured to change the polarization state of the second P-polarized beam into S-polarized light, which is recorded as a third S-polarized light; the reflecting mirror C reflects the third S-polarized light into the first double frequency crystal to generate double frequency light due to multiple frequency effect; the dichroic mirror D and the dichroic mirror E is configured to separate the double frequency light; the absorbing block B is configured to collect the residual fundamental frequency light; the second double frequency crystal is configured to generate double frequency light due to the multiple frequency effect of the second S-polarized light; the triple frequency crystal is configured to generate triple frequency light due to the triple frequency effect of the remaining S-polarized light and the double frequency light generated by the second double frequency crystal; the dichroic mirror A and the dichroic mirror B are configured to separate the triple frequency light; the absorbing block C is configured to collect the residual base frequency light and double frequency light.

6. The ultrafast laser according to claim 5, wherein the beam splitting and polarization controlling unit further comprises another Pockels cell, and another Pockels cell driver; the another Pockels cell and the another polarization beam splitter is sequentially placed in the reflected optical path of the polarization beam splitter, the double frequency unit and the triple frequency unit are respectively placed in the transmitting and reflecting optical paths of the another polarization beam splitter, and the Pockels and the Pockels cell driver controls whether the fundamental frequency light is reflected or transmitted through the polarization beam splitter to achieve rapid switching of polarization state; the another Pockels cell and the another Pockels cell driver control whether a S-polarized light is reflected or transmitted through the another polarization beam splitter to achieve rapid switching polarization state.

7. The ultrafast laser according to claim 6, wherein the optical beam combining unit comprises a reflecting mirror D, a fundamental frequency half wave plate B, a double frequency half wave plate, a dichroic mirror F that reflects the double frequency light and transmits the fundamental frequency light, a dichroic mirror C that reflects triple frequency light and transmits the fundamental frequency light, and a Brewster window B of the fundamental frequency light; the reflecting mirror D is configured to reflect the first P-polarized light into the fundamental frequency light half wave plate B; the fundamental frequency light half wave plate B and the double frequency light half wave plate are configured to change the polarization states of the first P-polarized light and the double frequency light, to make the polarization states of the first P-polarized light, double frequency light, and triple frequency light the same; the dichroic mirror F is configured to combine the first P-polarized light and the double frequency light; the dichroic mirror C is configured to combine the first P-polarized light, double frequency light, and triple frequency light; the Brewster window B is configured to transmit the first P-polarized light, double frequency light, and triple frequency of the same polarization state.

8. The ultrafast laser according to claim 1, wherein a time interval between a pulse falling edge of the fundamental frequency light and a pulse falling edge of the driving voltage of the Pockels cell is represented by t1, and t1=0.

* * * * *